United States Patent
Becker et al.

(10) Patent No.: US 8,720,463 B2
(45) Date of Patent: May 13, 2014

(54) SHOWER SYSTEM FOR AIRCRAFT

(75) Inventors: Ole Becker, Hamburg (DE); Christiane Lindauer, Hamburg (DE); Frank Rahn, Buxtehude (DE)

(73) Assignee: Airbus Operations GmbH (DE)

( * ) Notice: Subject to any disclaimer, the term of this patent is extended or adjusted under 35 U.S.C. 154(b) by 843 days.

(21) Appl. No.: 11/637,631

(22) Filed: Dec. 12, 2006

(65) Prior Publication Data

US 2007/0214562 A1   Sep. 20, 2007

Related U.S. Application Data

(60) Provisional application No. 60/749,763, filed on Dec. 13, 2005.

(30) Foreign Application Priority Data

Dec. 13, 2005   (DE) .......................... 10 2005 059 552

(51) Int. Cl.
  *A47K 3/00*   (2006.01)
(52) U.S. Cl.
  USPC .................... 137/2; 137/1; 137/899.2; 4/596; 4/602
(58) Field of Classification Search
  USPC ............ 137/119.03, 119.05, 889.2, 899.2, 2, 137/487.5, 907, 1; 4/596, 602, 676, 605; 239/67
  See application file for complete search history.

(56) References Cited

U.S. PATENT DOCUMENTS

| | | | | |
|---|---|---|---|---|
| 2,115,628 A * | 4/1938 | Fredericks | ..................... | 137/467 |
| 3,297,046 A * | 1/1967 | Hall | ......................... | 137/119.05 |
| 4,082,225 A * | 4/1978 | Haynes | ....................... | 239/428.5 |
| 4,095,610 A * | 6/1978 | Priesmeyer | ................... | 137/100 |
| 4,224,700 A * | 9/1980 | Bloys | ................................ | 4/568 |
| 4,945,943 A * | 8/1990 | Cogger | ........................ | 137/360 |
| 5,518,019 A * | 5/1996 | Clare | ....................... | 137/119.03 |
| 5,829,475 A * | 11/1998 | Acker | ............................ | 137/337 |
| 5,979,776 A * | 11/1999 | Williams | ................... | 236/12.12 |
| 6,470,512 B1 * | 10/2002 | Lau et al. | ........................... | 4/612 |
| 6,481,028 B1 * | 11/2002 | Hsia | .................................... | 4/570 |
| 2002/0152549 A1 * | 10/2002 | Kanaya et al. | ..................... | 4/596 |
| 2003/0034405 A1 * | 2/2003 | Hsieh | ............................ | 239/553 |
| 2005/0166945 A1 * | 8/2005 | Whitmore | ....................... | 134/18 |

FOREIGN PATENT DOCUMENTS

| | | |
|---|---|---|
| DE | 199 56 668 A1 | 9/2001 |
| DE | 201 15 721 U1 | 9/2001 |
| DE | 103 08 498 A1 | 9/2004 |
| GB | 1602191 A | 11/1981 |
| WO | WO-03/005796 A2 | 1/2003 |

\* cited by examiner

*Primary Examiner* — John Fox
*Assistant Examiner* — Kevin Murphy
(74) *Attorney, Agent, or Firm* — Lerner, David, Littenberg, Krumholz & Mentlik, LLP

(57) ABSTRACT

A shower system for use in aircraft while in flight, the shower system having a feed line through which a stream of water can be supplied to the shower system; a showerhead from which a prepared stream of shower water can exit the shower system and a water stream parameter modification device for modifying at least one parameter of the water stream, said water stream parameter modification device incorporated between the feed line and the showerhead, wherein the water stream parameter modification device comprises at least one valve, which opens when not exposed to any pressure upstream to enable an evacuation of the entire shower system.

16 Claims, 1 Drawing Sheet

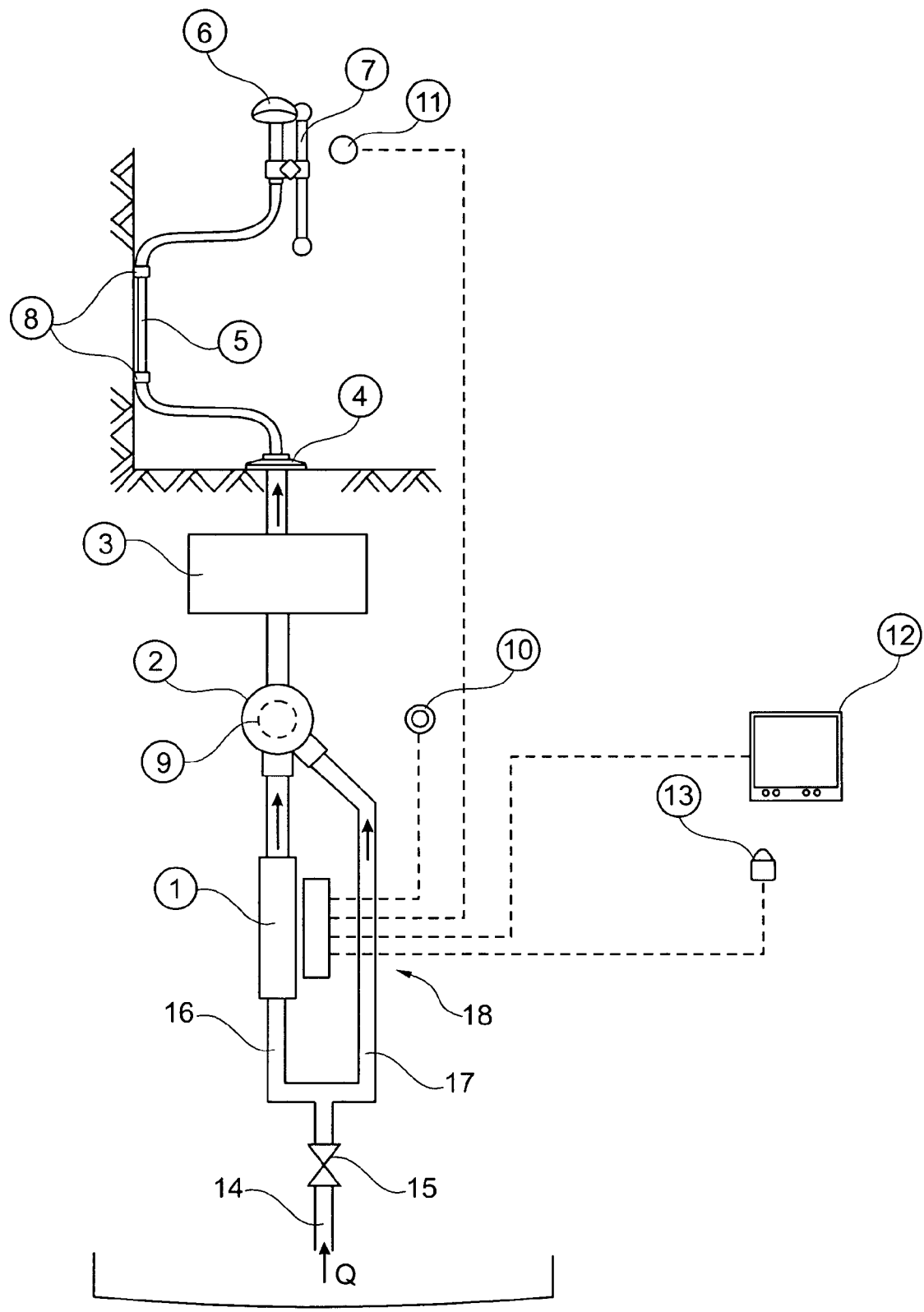

SHOWER SYSTEM FOR AIRCRAFT

CROSS-REFERENCE TO RELATED APPLICATIONS

This application claims the benefit of the filing date of U.S. Provisional Patent Application No. 60/749,763 filed Dec. 13, 2005, the disclosure of which is hereby incorporated herein by reference.

BACKGROUND OF THE INVENTION

This invention relates to the general area of sanitation engineering.

In particular, the invention relates to a shower system designed especially for use in commercial aircraft. In addition, the invention relates to the use of such a shower system in an aircraft, as well as to an aircraft equipped with such a shower system.

Known from the public commercial domain, e.g., from outdoor or indoor swimming pools, are showers that are equipped with a mechanical shower time limiting device, which release a stream of shower water for a limited time at the press of a button, without it being possible to terminate this stream of shower water before the time has elapsed. Also known from the public commercial domain are showers in which hot water can only be activated for a predetermined time by depositing coins. However, once a person has activated a shower stream, it cannot be deactivated again before a predetermined period has elapsed, which may in the end result in elevated water consumption and little comfort. Precisely limiting water consumption to a specific maximum quantity per shower cycle may also be not possible with the known shower systems.

Furthermore, those showers may have no drainage facilities, i.e., for evacuating fresh water from the shower system. In this way, the known showers may form so-called "water bags", understood to denote water inclusions in the shower system lines located in a local deep point of the lines. The existence of such water bags may make it impossible to use known shower systems in the area of commercial aeronautics, since such residual water may tend to freeze, for example, if an aircraft remains unheated in a cold location for a longer period of time, which can end up damaging the shower system, in particular its lines. In addition, these water bags may become a source of growth for germs and harmful microorganisms, which may result in microbic contaminations, thereby impairing the water quality.

SUMMARY OF THE INVENTION

In a first aspect of the invention, a shower system is provided which is designed especially for use in an aircraft, and to this end encompasses a feed line via which a stream of water can be supplied to the shower system. The shower system further encompasses a showerhead, from which a shower water stream prepared from the water stream can be passed out of the shower system. Another component encompassed by the shower system is a device with which at least one parameter of the shower water stream, e.g., its temperature or flow rate per unit of time, can be varied.

To this end, the device for modifying the water temperature is incorporated between the feed line and showerhead. In order that the shower system can be drained when not in use, i.e., that the water can be removed from the system, the device for modifying the parameters of the shower water stream has at least one valve, which opens when there is no pressure upstream, so that the shower system can be drained when not in use. By arranging a valve of this design, which opens when not exposed to a stream of water upstream, the shower system can be completely emptied of water, which may make it possible to a very great extent to eliminate the danger of frozen lines, which may damage the shower system.

The shower system may be equipped with a flexible line, which at least indirectly connects the showerhead and the water stream parameter modification device. However, this arrangement may require an additional outlay to configure the connection between the showerhead and water parameter modification device with the shower not in use in such a way as to prevent low points where water bags can form. This water bag formation may be effectively precluded above all by having the shower system encompass at least one fixation means, which can be used to temporarily lay out the hose so that it exhibits no low points when installed where water bags might otherwise form. As an alternative, no separate outlay may be required for drainage purposes in a shower system where the showerhead is permanently installed on a wall, as long as the water lines are set up in a downward direction.

In a further embodiment of the shower system, the water stream parameter modification device may exhibit a water heater for generating a warm water stream downstream from the at least one feed line. To be able to generate an individual warm water temperature, the shower system or water stream parameter modification device may further have a mixing unit for mixing the warm water stream with a cold water stream, which is situated downstream from the water heater for this purpose.

In another aspect of the invention, the water stream parameter modification device may further exhibit a water-processing unit, e.g., a filter or UV light source, which may make it possible to improve the water quality.

In order to reduce water consumption using the shower system according to the invention, the shower system according to the invention further contains an actuation device, with which the shower water stream may be both activated and deactivated. The actuation device is here designed in such a way that its repeated activation and deactivation produces a shower water stream of a predetermined quantity [$m^3$], which corresponds to a predefined shower time owing to the technically limited volumetric flow [$m^3/s$] of the shower system, in the form of shower water streams [$m^3/s$] spaced apart in time that exit the showerhead. As opposed to known showers or shower systems from the public commercial domain, a stream of shower water may hence be interrupted once activated, allowing a person to interrupt the shower stream, e.g., while shampooing, in the end reducing overall water consumption.

In order to keep areas lying outside the shower area largely free of splashing water, the shower system according to the invention may further exhibit a separation means, such as a shower curtain or the like, so that access to a shower area as defined by the steam of shower water exiting the showerhead can be sealed off. The separation means may be coupled with a valve such as e.g. a butterfly valve, which may interact with the actuation device, for example, for interrupting the shower water stream via a path of action in such a way that the stream of shower water is interrupted if the separation means is not closed, so that the shower water stream is appropriately interrupted, or not even be activated at all, with the shower curtain open.

In another aspect of the invention, the shower system may further encompass a control unit, which is set up, for example, to adjust the absolute quantity of available shower water, the maximum shower water stream, the maximum shower stream duration, the maximum hot water stream temperature, and the water tracking time. Water tracking time involves a time interval before the available shower stream duration expires, wherein once the latter has been reached, the stream of shower water is at least temporarily interrupted for a short time to indicate the nearing end of the shower stream duration. The water tracking time can also incorporate other indicators for signaling the pending shower time expiration, e.g., acoustic or visual signals.

In another aspect of the shower system according to the invention, the system may encompass a display set up to indicate at least one parameter from the group comprised of current shower water stream, overall shower water quantity, remaining shower water quantity, overall shower stream duration, remaining shower stream duration, elapsed shower stream duration, and shower stream temperature.

BRIEF DESCRIPTION OF THE DRAWINGS

The invention will be described by way of example below, with reference to the attached drawing. Let it be noted at this juncture that the embodiment of the invention shown in the FIGURE is strictly an exemplary illustration, and in particular must not be construed as limiting the scope of protection in any way. Shown on:

FIG. 1 is a diagrammatic view of a shower system according to the invention.

The representation is not necessarily to scale, but may reflect qualitative size ratios.

DETAILED DESCRIPTION

FIG. 1 shows a diagrammatic view of the shower system according to an exemplary embodiment of the invention. The shower system is supplied with a stream of water via a feed line 14. This stream of water is passed through the shower system, and finally exits the shower system again from a showerhead 6 in the form of a prepared stream of shower water. The shower system extends between the feed line 14 and showerhead 6, and exhibits at least one device for modifying at least one water stream parameter. This device, which will be described in greater detail below, may be used, for example, to regulate the temperature of the water stream, or the flow rate.

In order to completely drain the shower system, i.e., empty it, the specified device for modifying the water stream parameters incorporates at least one valve 15, the functionality of which is such that it opens when under no pressure upstream. As a result, the entire shower system may be evacuated, for example, given a partial vacuum applied to the feed line 14, thereby counteracting the formation of water bags or inclusions. While the valve 15 is here depicted immediately downstream from the feed line, it may also be located elsewhere, e.g., in the mixing unit 2.

Even though the showerhead 6 may be permanently installed on a wall, greater comfort when showering may be achieved by connecting the showerhead 6 at least indirectly with the water stream parameter modification device by way of a flexible hose 5. Since such a hose 5 may tend to sag with the shower system not in use, however, allowing a water bag to form in the sag, the shower system has at least one fixation means 8, e.g., a clip, with which the hose 5 can be at least temporarily laid out not to exhibit any low points, as shown on FIG. 1. In this depiction, the hose 5 is secured by two clips to an installation wall in such a way as to give it a constant gradient without low points. In addition, the fixation means protect the hose from undesired position changes in the event of vibration in the aircraft.

The water stream parameter modification device will be described in greater detail below. This device here in particular encompasses a water heater 1, for example, a boiler, a flow heater, or a combination of the two, a mixing unit 2 downstream from the water heater 1, as well as a water-processing unit 3, with which the water quality may be improved. As shown on FIG. 1, all of the mentioned components may be incorporated into a space behind the installation wall, and connected with the showerhead 6 via the shower hose 5, which is at least indirectly joined with the water stream parameter modification device by a connecting branch.

Proceeding from the feed line 14, the water stream is initially divided into two channels 16, 17, wherein the channel 17 is connected as a bypass line in parallel to the channel 16, in which the aforementioned water heater 1 may be arranged. The hot water supply device 1 heats the water coming from the feed line 14, and relays it to the mixing unit 2, where the shower water temperature may be set by mixing. In addition, the mixing unit 2 encompasses an electronically controllable valve 9, which may be used to activate or deactivate the stream of shower water to the showerhead 6, which may make it possible to discharge a predeterminable quantity of shower water [$m^3$] from the showerhead 6 in the form of shower streams [$m^3/s$] spaced apart in time. This valve 9 can be used additionally or alternatively to the valve 15, and be designed in such a way as to open automatically when under no pressure upstream, so that the entire shower system may be drained/evacuated. Valve 9 can incorporate a ventilation function when filling the shower system with water. Further, the mixing unit 2 may incorporate a volumetric flow limiter, e.g., a throttle, which can be used to set the maximum shower water stream. A volumetric flow limiter may also be integrated in another location, e.g., in the showerhead.

Located downstream form the mixing unit according to an exemplary embodiment of the shower system according to the invention shown on FIG. 1 is a water-processing unit 3, e.g., a filter or UV light source, which may be used to improve shower water quality. While this water-processing unit is here shown downstream from the mixing unit 2, it may of course be set up elsewhere, e.g., in the feed line 14.

In order to regulate the shower water temperature, the shower system according to the invention may encompass a rotary knob (not shown), which can be used to adjust the ratio between cold and hot water as needed. An operator may activate and then deactivate the electronically actuatable valve 9 mentioned above by means of a pushbutton 10, which may make it possible to apportion a predetermined shower water quantity [$m^3$] in a plurality of shower water streams [$m^3/s$] spaced apart in time, meaning that a quantity of shower water available for a shower cycle can be metered and discharged in intervals.

For example, to inform a person taking a shower about the already elapsed shower time, the shower system according to the invention may encompass a shower time display 11, which indicates the already elapsed and/or still remaining shower time.

The electronically actuatable valve 9 already discussed above along with the pushbutton 10 for actuating the valve may be part of an actuation device 18 for activating and deactivating the shower water stream, or interact with the latter, which is only shown diagrammatically here. This actuation device 18 may be coupled with an external control unit 12, for example, which the flight personnel may use to set the shower time per shower cycle in one-minute increments to between 5 and 10 minutes, for example. In addition, the external control unit may also be used to set the entire shower water quantity [$m^3$], the maximum shower water stream, the maximum water stream, the maximum hot water stream temperature and the so-called water tracking time. Hence, the control unit 12 may be used to set the maximum water stream in the feed line to a standard value of 5 l/min, for example.

To prevent water from splashing outside the shower area defined by the stream of shower water exiting the showerhead 6, the showerhead may further have a switch 13, which only opens the butterfly valve 15 or the valve 9 only if a separation means, e.g., shower curtain, is closed.

As clearly evident from the preceding, arranging the shower system according to the invention as described above may make it possible to achieve a drainage, or evacuation, of the shower system with the latter under no pressure. Further, the overall water consumption may be reduced by limiting the available overall shower duration. However, this may have no negative effect on shower comfort, since the shower water stream can be divided into any shower water stream intervals desired using the actuation device described above, so that the shower water stream may be interrupted for shampooing, for example.

In addition, let it be noted that "encompassing" or "comprising" does not preclude any other elements or steps, and "a" or "an" do not preclude a plurality. Further, let it be noted that any features or steps described with reference to one of the above exemplary embodiments can also be used in combination with other features or steps from other exemplary embodiments described above. Reference numbers in the claims must not be construed as limiting.

REFERENCE LIST

1 Water heater device
2 Mixing unit
3 Water-processing unit
4 Connecting branch
5 Shower hose
6 Showerhead
7 Shower rod
8 Fixation means, clip
9 Valve
10 Pushbutton
11 Display
12 External control unit
13 Switch
14 Feed line
15 Butterfly valve or closing valve
16 First channel
17 Second channel
18 Actuation device

The invention claimed is:

1. An in-aircraft shower system configured for use in an aircraft while in flight, said shower system comprising:
a feed line configured to supply a stream of water to the shower system;
a showerhead configured for exit of a prepared stream of shower water from the shower system;
a water stream parameter modification device for modifying at least one parameter of the water stream, said water stream parameter modification device incorporated between the feed line and the showerhead,
at least one valve configured to open when not exposed to upstream pressure such that the shower system is drained and inclusions of water in the entire shower system are substantially precluded;
an external electronic control unit configured to allow presetting at least one parameter selected from the group consisting of a maximum overall shower water quantity per shower cycle, maximum shower water stream, maximum overall shower stream duration per shower cycle, maximum hot water stream temperature, and water tracking time; and
an actuation device for activating and deactivating the shower water stream, the activation device configured such that a repeated activation and deactivation thereof is configured to apportion the preset maximum overall shower water quantity for a current shower cycle in the form of separate shower water streams spaced apart in time and that exit the showerhead, the preset maximum overall shower water quantity corresponding to the maximum overall shower stream duration for the current shower cycle.

2. The shower system of claim 1, further comprising:
a flexible hose that at least indirectly connects the showerhead to the water stream parameter modification device.

3. The shower system of claim 2, further comprising:
at least one fixation device by which said flexible hose is temporarily laid out in such a way as to exhibit no low points, thereby precluding the formation of inclusions of water.

4. The shower system of claim 3, wherein said at least one valve is configured to ventilate the shower system when filling the shower system with water.

5. The shower system of claim 1, wherein the feed line branches into first and second channels, the first channel being a hot water channel and the second channel being a cold water channel, and wherein the water stream parameter modification device further comprises:
a water heater downstream from the at least one feed line and coupled to the hot water channel for generating a stream of hot water in the hot water channel;
a mixing unit arranged downstream from the water heater and arranged to receive the first and second channels, the mixing unit for mixing the hot water stream supplied by the hot water channel with a cold water stream supplied by the cold water channel.

6. The shower system of claim 1, wherein the water stream parameter modification device further comprises:
a water-processing unit for improving water quality.

7. The shower system of claim 1, further comprising a valve for interrupting the stream of shower water, and a separation device to seal access to a shower area defined by the shower water stream exiting the showerhead, wherein the separation device is coupled with the valve via a path of action in such a way as not to interrupt the shower water stream when the separation device is not closed.

8. The shower system of claim 1, further comprising:
a display indicating at least one parameter from the group consisting of current shower water stream, overall shower water quantity, remaining shower water quantity, overall shower stream duration, remaining shower stream duration, elapsed shower stream duration, and shower stream temperature.

9. The shower system of claim 1, wherein the system is drainable by applying an at least partial vacuum, and wherein the system is drained through the feed line given the partial vacuum applied to the feed line.

10. The shower system of claim 1, wherein the at least one valve is arranged in the feedline outside and upstream of said water stream parameter modification device.

11. The shower system of claim 1, further comprising a pushbutton;

wherein the actuating device is configured to respond to the pushbutton for requesting the repeated activation and deactivation of the shower water stream.

12. A method of operating a shower system in an aircraft, the system having a feed line configured to supply a stream of water to the shower system, a showerhead configured for exit of a prepared stream of shower water from the shower system, a device for modifying at least one parameter of the water stream, at least one valve configured to open when not exposed to upstream pressure, such that the shower system is drainable through so as to preclude inclusion of water in the entire shower system after drainage; the method comprising:

externally and electronically presetting at least one parameter from the group consisting of a maximum overall shower water quantity per shower cycle, maximum shower water stream, a maximum overall shower stream duration per shower cycle, maximum hot water stream temperature, and water tracking time, and responsive to a user request, repeatedly activating and deactivating by an activation device, so as to apportion the preset maximum overall shower water quantity for a current shower cycle in the form of separate shower water streams spaced apart in time and that exit the showerhead, the preset maximum overall shower water quantity corresponding to the maximum overall shower stream duration for the current shower cycle.

13. The method of claim 12, wherein the system is drainable by applying an at least partial vacuum, and wherein the system is drained through the feed line given the partial vacuum applied to the feed line.

14. An aircraft having a shower system comprising a feed line configured to supply a stream of water to the shower system, a showerhead configured for exit of a prepared stream of shower water from the shower system, and a device for modifying at least one parameter of the water stream, at least one valve configured to open when not exposed to upstream pressure, such that the shower system is drainable so as to preclude inclusions of water in the entire shower system after drainage, an external electronic control unit configured to allow presetting at least one parameter from the group consisting of a maximum overall shower water quantity per shower cycle, maximum shower water stream, a maximum overall shower stream duration per shower cycle, maximum hot water stream temperature, and water tracking time, and an actuation device for activating and deactivating the shower water stream, the activation device configured such that a repeated activation and deactivation thereof is configured to apportion the preset maximum overall shower water quantity for a current shower cycle in the form of separate shower water streams spaced apart in time and that exit the showerhead, the preset maximum overall shower water quantity corresponding to the maximum overall shower stream duration for the current shower cycle.

15. The aircraft of claim 14, wherein the system is drainable by applying an at least partial vacuum, and wherein the system is drained through the feed line given the partial vacuum applied to the feed line.

16. The aircraft of claim 14, wherein the at least one valve is arranged in the feedline outside and upstream of said water stream parameter modification device.

* * * * *